United States Patent [19]

Cornell

[11] Patent Number: 4,827,097

[45] Date of Patent: May 2, 1989

[54] CONTINUOUS TRANSFORMER AND MOTOR

[75] Inventor: Jeffrey K. Cornell, South St. Paul, Minn.

[73] Assignee: Litton Systems, Inc., Beverly Hills, Calif.

[21] Appl. No.: 860,632

[22] Filed: May 7, 1986

[51] Int. Cl.[4] .............................................. H05B 9/06
[52] U.S. Cl. ...................... 219/10.55 B; 219/10.55 R
[58] Field of Search ................ 219/10.55 B, 10.55 R, 219/10.55 M, 10.55 A; 310/68 R

[56] References Cited

U.S. PATENT DOCUMENTS

| | | | |
|---|---|---|---|
| 2,679,595 | 5/1954 | Spencer | 219/10.55 B |
| 3,341,723 | 9/1967 | Tourtelbt | 310/68 R |
| 3,961,152 | 6/1976 | Staats | 219/10.55 B |
| 4,096,370 | 6/1978 | Duncan | 219/10.55 B |
| 4,104,561 | 8/1978 | Iwata | 219/10.55 B |
| 4,121,079 | 10/1978 | Harman | 219/10.55 B |

OTHER PUBLICATIONS

Litton Microwave Cooking Drawing D43363 Revision A.
Fractional and Subfractional Horsepower Electric Motors, Cyril G. Veinott, McGraw-Hill Book Company, 1970, pp. 192–214.
Coleman AC Motors brochure, pp. 2, 10 and 11.
One-Page Motor Hang Tag F8000-1, Barber Colman Company.

*Primary Examiner*—M. H. Paschall
*Attorney, Agent, or Firm*—John M. Haurykiewicz; Walter R. Thiel

[57] ABSTRACT

A combined transformer and motor having a continuously energized primary winding producing a continuous output voltage from a transformer winding and a selectively enabled motor shaft rotational output which is selectively actuated by powering a further primary winding.

5 Claims, 4 Drawing Sheets

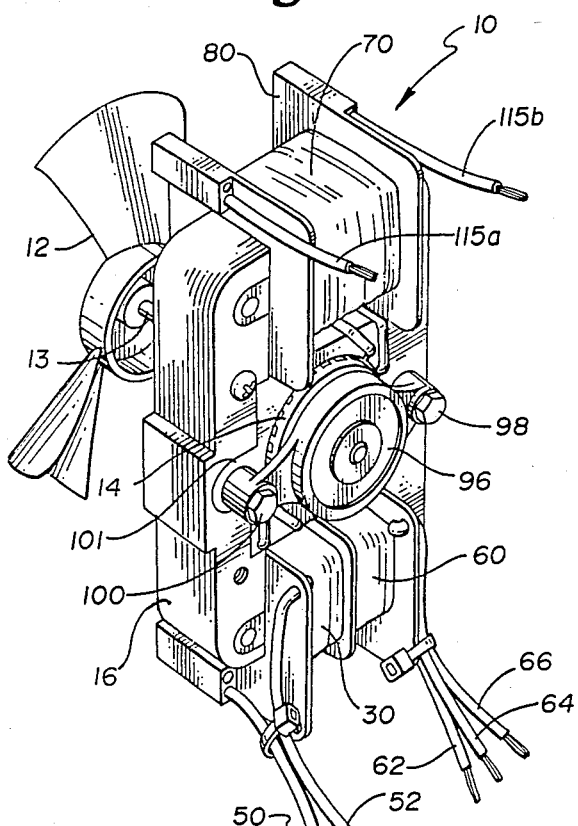
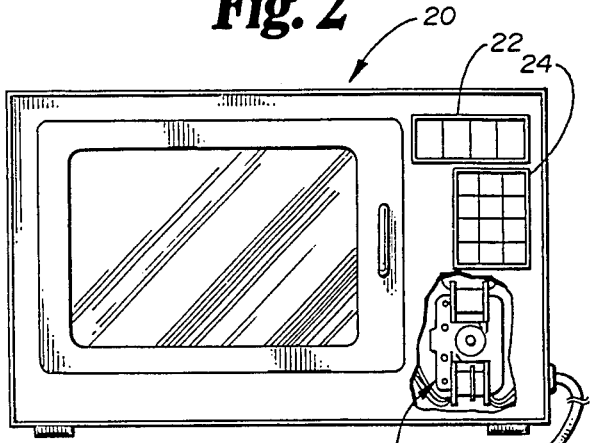
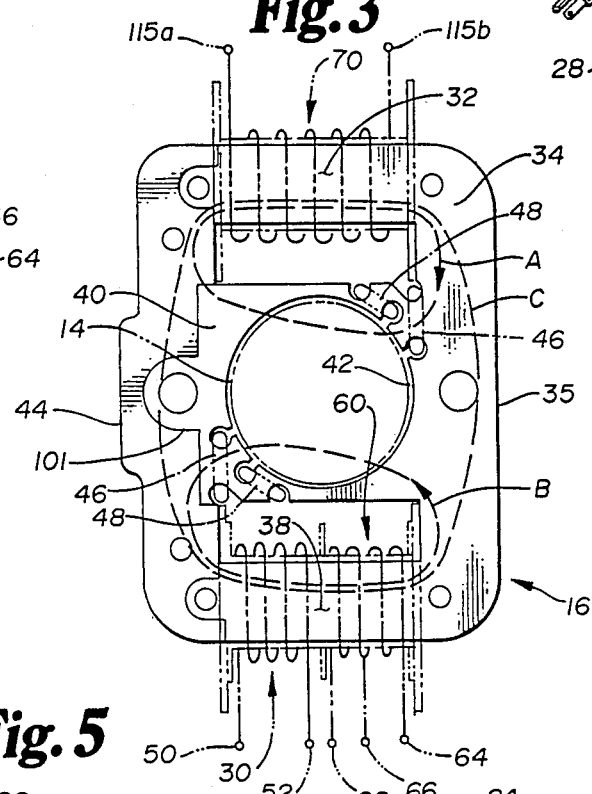
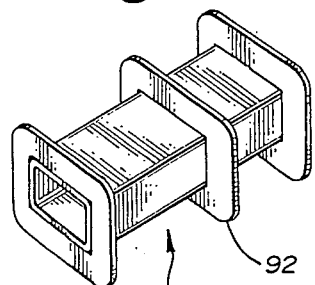
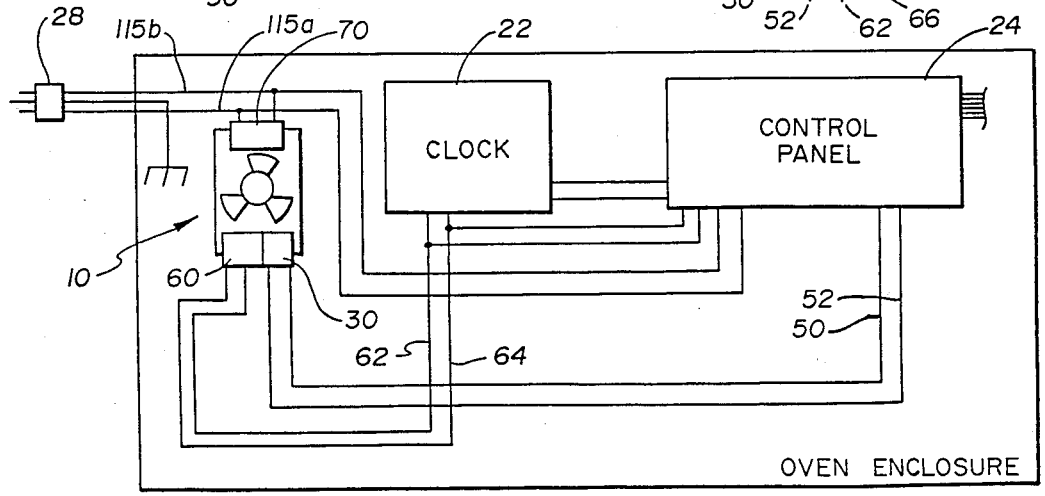

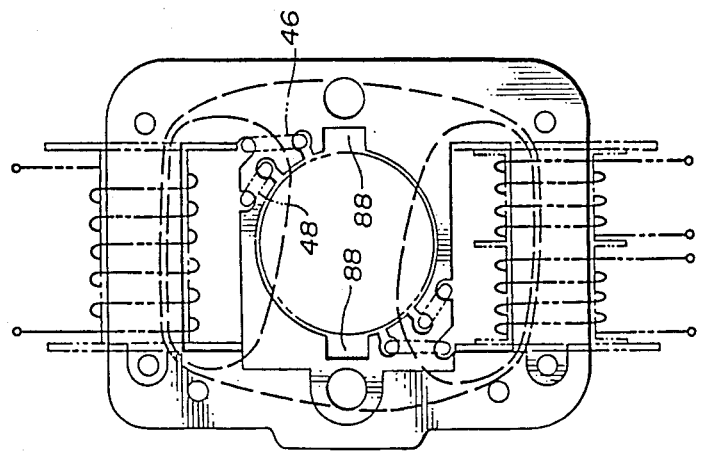
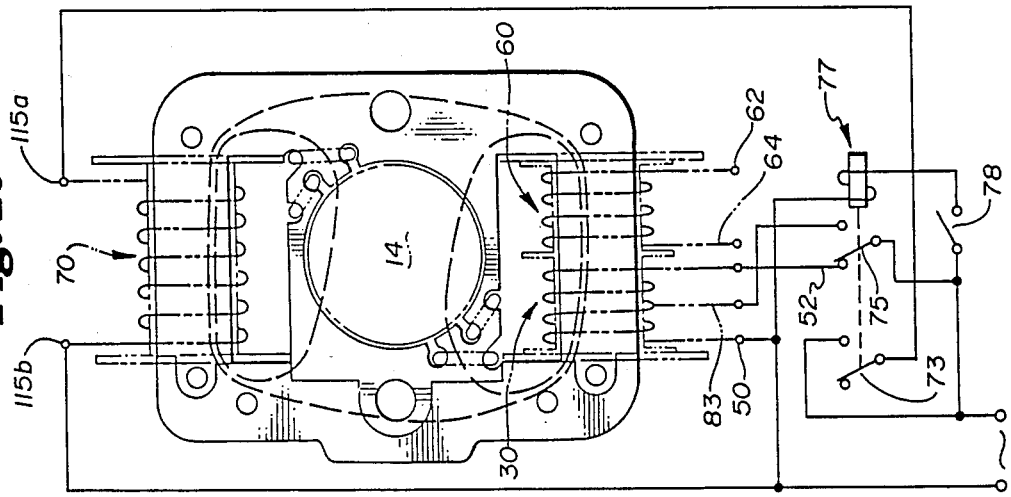
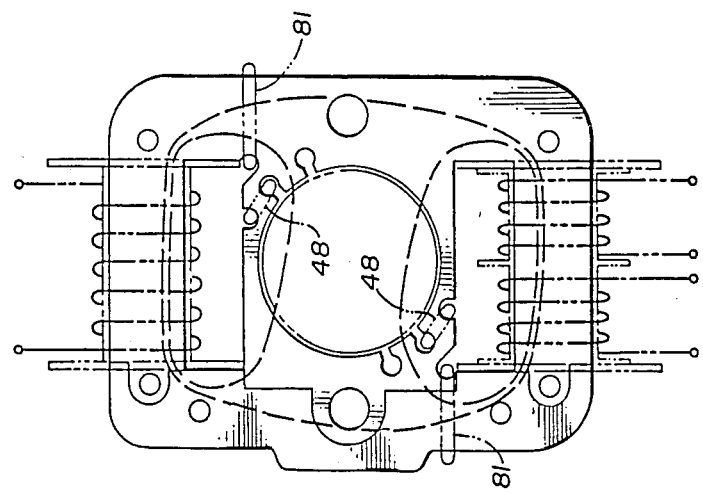

CONTINUOUS TRANSFORMER AND MOTOR

BACKGROUND OF THE INVENTION

This invention relates to a combined motor and transformer structure which offers space and cost savings and other advantages over the use of separate step down transformers and conventional motors used in combination in certain applications. More particularly, it relates to a motor and transformer combination of particular utility in a microwave oven for providing a continuous stepped down voltage for driving oven controls and displays and for driving a ventilating fan only during operation of the oven.

Conventional microwave ovens have traditionally utilized both a conventional and separate step down transformers and conventional AC motors to provide a stepped down voltage and power for a fan. Because both structures utilize fairly large stacks of laminations and associated windings to accomplish their respective functions, the multiplicity of windings and laminations results in increased cost and weight in devices requiring both motor and continuous transformer functions.

Although there have been combined motor and transformer structures in the prior art, none of the structures known permit the continuous supply of output voltage from the transformer independent of whether the motor is either running or stopped. In those structures, the transformer secondary winding was typically wound over the motor winding so that the secondary transformer winding would only carry a voltage at times when the motor was in operation.

SUMMARY OF THE INVENTION

A primary object of the invention is to provide a combined transformer and motor for providing a continuous output from a transformer and an intermittently operable motor.

A further object of the invention is to provide a transmotor for providing an output voltage proportional to an input voltage and for providing a selectively driven rotatable shaft, the transmotor having a magnetic flux conducting structure having first and second flux conducting paths therethrough and also having a first winding operatively coupled to the first flux conducting path of the flux conducting structure and continuously connected to a source of input voltage for inducing flux in the first flux conducting path of the magnetic flux conducting structure. The transmotor also has a second winding operatively coupled to the second flux conducting path selectively connectable to the source of input voltage to induce flux therein, and third winding operatively coupled to receive flux from either the first or second flux conducting path to produce an output voltage. The transmotor further includes a motor rotor mounted on the flux conducting structure for receiving flux conducted in the first and second flux conducting paths, the rotor constructed and arranged for rotation when the second winding is connected to a source of input voltage and for remaining stationary when the second winding is not connected to a source of input voltage.

A further object of the invention is to provide a transformer which includes a magnetic flux conducting structure having transformer and auxiliary flux conducting paths therethrough, transformer primary winding means operatively coupled to the transformer flux conducting path of the flux conducting structure and continuously connected to a source of input voltage for inducing flux in the transformer flux conducting path of the magnetic flux conducting structure. The transformer also includes transformer secondary winding means operatively coupled to the transformer flux conducting path to produce a continuous output voltage, an electromechanical rotor mounted on the flux conducting structure for converting flux into mechanical motion when energized by flux in the transformer and the auxiliary flux conducting paths and for remaining passive when flux is received only from the transformer flux conducting path. Finally the transformer also includes an auxiliary winding means operatively coupled to the auxiliary flux conducting path and selectively connectable to a source of input voltage to thereby induce flux therein to energize the electromechanical means.

Yet another object of the invention is to provide a motor comprising stator means having first and second flux conducting paths therein and including first stator winding means operatively coupled to the first flux conducting path and selectively connectable to a power source thereby to induce flux in the first flux conducting path. The motor also includes a second stator winding means operatively coupled to the second flux conducting path of the stator means and continuously connected to the power source for inducing flux in the second flux conducting path and auxiliary winding means operatively coupled to one of the first and second flux conducting paths to produce a continuous output voltage. The motor rotor is operatively mounted for rotation relative to the stator means and is constructed and arranged for receiving flux conducted in the first and second flux conducting paths, the motor rotor constructed and arranged for rotation when the first stator winding is connected to a power source and for remaining stationary when the first stator winding is not connected to the power source.

A still further object of the invention is to provide in an oven including operating elements which are continuously energized from a transformer having a voltage proportional to the line voltage and a movable element operated only when the oven is operated, a combination actuator and transformer device. The device includes a magnetic flux conducting structure having first and second flux conducting paths therethrough, a first winding operatively coupled to the first conducting path of the flux conducting structure and continuously connected to a source of line voltage for inducing flux in the first flux conducting path of the magnetic flux conducting structure, a second winding operatively coupled to the first flux conducting path to produce a continuous output voltage proportional to the magnitude of the line voltage, a third winding operatively coupled to the second flux conducting path and selectively connectable to the source of input voltage to thereby induce flux therein, and a movable element mounted on the flux conducting structure for receiving flux conducted in the first and second flux conducting paths. The movable element is constructed and arranged for movement when the third winding is connected to a source of input voltage as the oven is operated and for remaining stationary when the third winding is not connected to a source of input voltage when the oven is not being operated. The device also includes switch means connected to the third winding means to energize the third winding only when the oven is in operation.

BRIEF DESCRIPTION OF THE DRAWINGS

In the drawings:

FIG. 1 is a perspective view of a transmotor according to the present invention;

FIG. 2 is a front elevation view of a microwave oven partially cut away to show a transmotor in its general position of use;

FIG. 3 is a top view of the transmotor of FIG. 1;

FIG. 4 is a view of the bobbin upon which two electrical windings may be wound;

FIG. 5 is a simplified schematic diagram of the electrical connections of the transmotor of FIG. 1 installed in the microwave oven shown in FIG. 2;

FIG. 9 is a top view of an alternative embodiment of the transmotor utilizing modified shading pole positioning to improve voltage regulation;

FIG. 10 is a top view of an alternative embodiment of the transmotor utilizing a tapped winding to improve voltage regulation;

FIG. 11 is a top view of an alternative embodiment of the transmotor utilizing slots in the laminations adjacent the rotor to improve output voltage regulation.

DETAILED DESCRIPTION OF THE PREFERRED EMBODIMENTS

Figure 8:
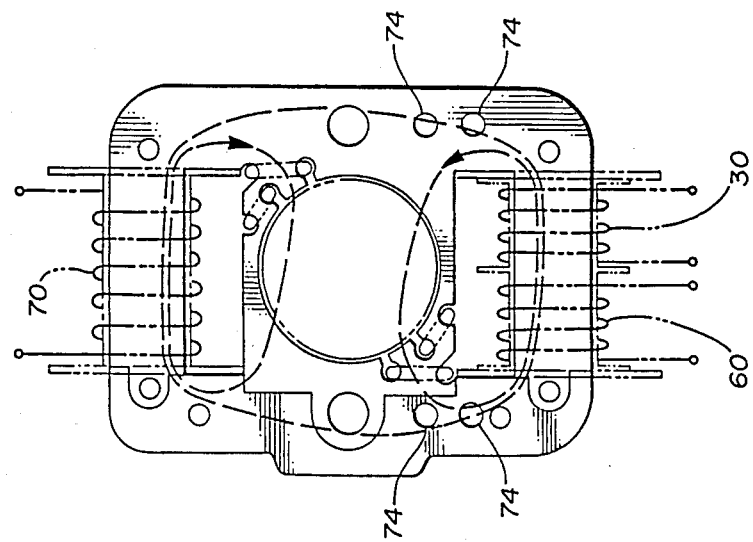
FIG. 8 is a top view of an alternative embodiment of the transmotor utilizing apertures in the laminations to improve voltage regulation.

Turning now to FIG. 1, a perspective view of a combined transformer and motor transmotor 10 is shown. Transmotor 10 drives a movable element such as a fan blade 12. As can be seen in FIG. 1, fan blade 12 is mounted on the projecting shaft 13 from an electromechanical means or motor rotor 14 in a conventional manner.

Transmotor 10 includes a stack of iron laminations 16. The iron laminations 16 serve both as the magnetic flux carrying stator for the motor portions of transmotor 10 but also as the transformer flux conducting path for the transformer portions of transmotor 10 as will be discussed.

FIG. 2 shows an oven 20 in which transmotor 10 is shown installed in a normal position of use. By means the movable element or rotor 14 transmotor 10 drives an air circulating fan 12 which is used to cool a microwave magnetron and to circulate air in the cooking cavity in a manner conventional to microwave ovens. In FIG. 2, operating elements such as displays 22 and switches 24 are shown. In many popular microwave ovens, these switches take the form of flexible switches which operate utilizing a reduced voltage. In order to avoid the necessity of providing a separate power switch to permit energization of the oven controls 24, the controls are continuously energized with stepped down line voltage whenever the power plug 28 is connected into a source of line voltage.

In a microwave oven, it is not considered to be desirable to operate the air circulating and cooling fan 12 on a continuous basis. The constant consumption of power and the wear occasioned by continuous operation of the motor would both be considered to be detrimental. In addition to the reduced motor life occasioned by continuous operation, the sound of the fan operating on a continuous basis would be perceived by the consumer to be a detrimental factor. For all of these reasons, the fan is only operated when the oven is in operation. In order to provide for a motor that can be turned on and off and a constant source of stepped down voltage, conventional microwave ovens provide separate step down transformers and ventilation motors. The combined transformer and motor or transmotor 10 of the present invention combines both functions in a single and compact structure.

The physical constructional details of transmotor 10 are shown in FIG. 3. A primary winding 30 is wound about one leg 32 of a combined motor stator and transformer magnetic flux conducting structure 16. In order to facilitate the construction of the device, magnetic flux conducting structure 16 is formed into two main sections. A first section 34 is roughly E-shaped with a vertical section 35 as shown in FIG. 3 with leftwardly projecting legs 32, 38 at the top and bottom and a central leg 40 projecting through the middle of the first section and having a aperture 42 therein for receiving the motor rotor 14.

An interfitting cap or bridging piece 44 forms the left side of the flux conducting structure 16 as viewed in FIG. 3. The flux carrying structure 16 thus has a pair of magnetic flux conducting paths labelled A and B on FIG. 3. The flux conducting path A passes through leg 32 under a motor drive or primary winding 70 along the upper portion of vertical section 35 of the flux conducting structure through the central leg 40 and back up along the top portion of the cap or bridging piece 44 and back again to leg 32. Other flux conducting path B follows the leftwardly projecting bottom leg portion 38 and thence upwardly along the lower portion of vertical section 35 of the first or E-shaped portion 34 of the lamination stack 16 and thence along the central leg 40 and then downwardly through the lower portion of the interfitting bridging piece 44 and back into the leftwardly projecting bottom leg. Of course, the direction of flux flow in the above description is arbitrary since it is realized that flux can move in either direction, depending upon the nature of the electrical field which excites the flux flow in the flux conducting path through the laminations.

It can be seen in FIG. 3 that both flux conducting paths A and B which pass through central leg 40, also will pass through the body of rotor 14 if it is of suitable permeability.

It will be recognized that the structure shown in FIG. 3 is suitable for driving rotor 14 as a shaded pole motor if shading coils 46 and 48 are provided as shown in FIG. 3 to delay the build-up of induced flux in their region of the stator structure of central leg 40 in order to produce a shifting flux in the air gap between central leg 40 and rotor 14. The flux in the air gap always shifts toward the shading coil.

As can be seen in FIG. 3, the flux in flux path B is established by winding 30 which is referred to herein as the first winding or the transformer primary winding or the first stator winding. If that is the only winding which is being driven by an AC voltage connected to leads 50 and 52, the flux has a third possible flux path, indicated as C on FIG. 3, through leg 38, vertical leg 35, top leg 32 and returning through the end piece 44. Because of the low permeability of the air gap between central leg 40 and rotor 14 and the low permeability due to the very narrow paths around rotor 14, most of the flux, when the primary winding 30 is the only energized winding, will be directed in the outer path C. The motor will, therefore, not rotate when only primary winding 30 is being driven.

In order to obtain a stepped down continuous output voltage, an auxiliary or transformer secondary winding 60 is wound about the leftwardly projecting bottom leg portion 38 of the lamination stack 16. It can be seen that, when primary winding 30 is continually energized by having voltage applied to conductors 50 and 52, the flux passing through the bottom leg portion 38 is continuous and will provide a constant voltage at terminals 62 and 64 of transformer secondary winding 60. As shown, a center tap 66 may also be brought out from transformer secondary winding 60.

A further or auxiliary or motor drive winding 70 is mounted on upper leg portion 32. Only when that winding is connected to the AC supply and is oriented to induce flux in flux path A having an instantaneous orientation relative to the flux in flux path B as shown in FIG. 3 can it be seen that rotor 14 will operate as a motor. In accordance with my invention, transmotor 10 will not operate as a motor when winding 30 alone is energized because the flux through the motor rotor 14 is too small when only that winding is energized.

Leads 50, 52 and 115A, 115B are connected to the AC power supply such that the flux in paths A and B oppose each other in the outer flux path C and are added to each other in the path through rotor 14. It can also be seen that the relative amount of flux circulating in flux path B in projecting leg portion 38 remains generally constant whether primary winding 30 alone or primary winding 30 and winding 70 are both energized. Thus, the voltage on secondary transformer winding 60 is relatively unaffected by whether or not transmotor 10 is operating to drive fan 12 or not.

Although the embodiment of transmotor 10 shown in FIG. 3 is suitable for many applications, there will be some applications where it is desirable or necessary to maintain the output of the step down transformer more nearly constant whether or not the motor is being operated. In the embodiment shown in FIG. 3, there is a decrease in the amount of flux coupled to the transformer secondary winding when the motor is operated by energizing the further motor winding.

One technique which has been found to be suitable for increasing the regulation of the transformer for both conditions of motor operation is to wind a compensation winding 72 on the leg of the laminated structure upon which the transformer winding is mounted. The "booster" winding 72 is energized when the motor energizing winding 70 is operated to compensate for the reduced flux coupled to the transformer secondary 60 when the motor is being driven.

Figure 6:
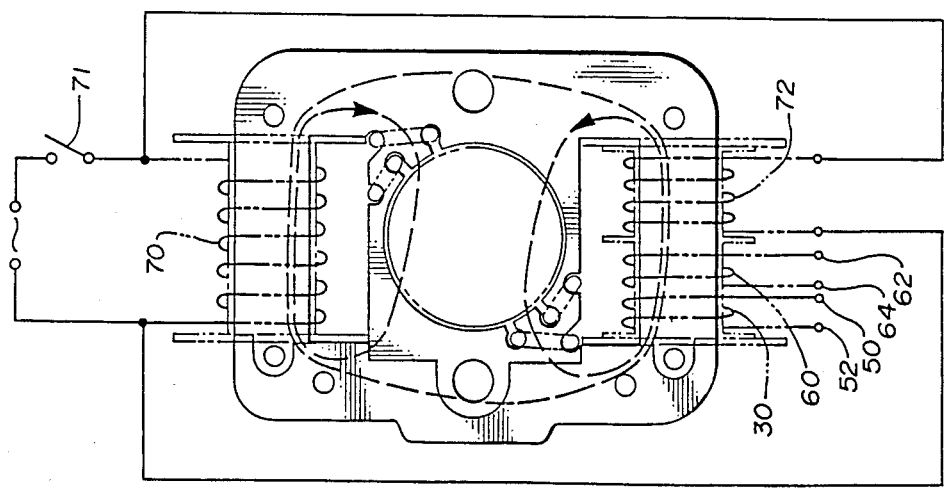

There are, of course, several alternatives available for actuating booster winding 72. In the arrangement shown in FIG. 6, the booster winding 72 is enabled by connecting it in parallel with the motor energizing winding 70 so that both windings are actuated at the same time by switch 71 only when it is desired to actuate the motor.

Figure 7:
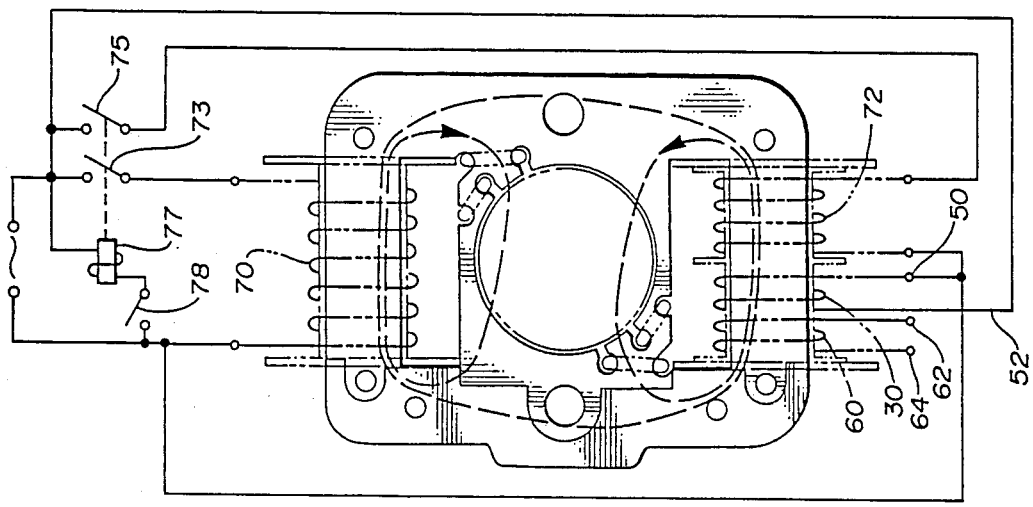
FIGS. 6 and 7 are a top view of an alternative embodiment of the transmotor utilizing a booster winding to improve output voltage regulation.

Another alternative method of energizing the booster winding is the relay switching structure illustrated in FIG. 7. One set of relay contacts 73 is used to enable the motor coil 70, while another set of contacts 75 energized by the same solenoid 77 is used to power booster coil 72 only when motor drive coil 70 is enabled by closing switch 78.

A further alternative for increasing the regulation of the transformer output for both conditions of operation of the motor is by lowering the amount of flux in the laminated structure when the device is operated solely as a transformer. One of the ways that this can be accomplished is by the addition of a number of holes 74 as shown in FIG. 8. The holes are drilled through the laminated structure 16 in the transformer portion thereof to improve the transformer regulation. Although additional switching circuitry is not required, as was the case with the embodiments in FIGS. 6 and 7, the power efficiency of the motor is reduced when the amount of iron in the transformer flux path is reduced.

Figure 12:
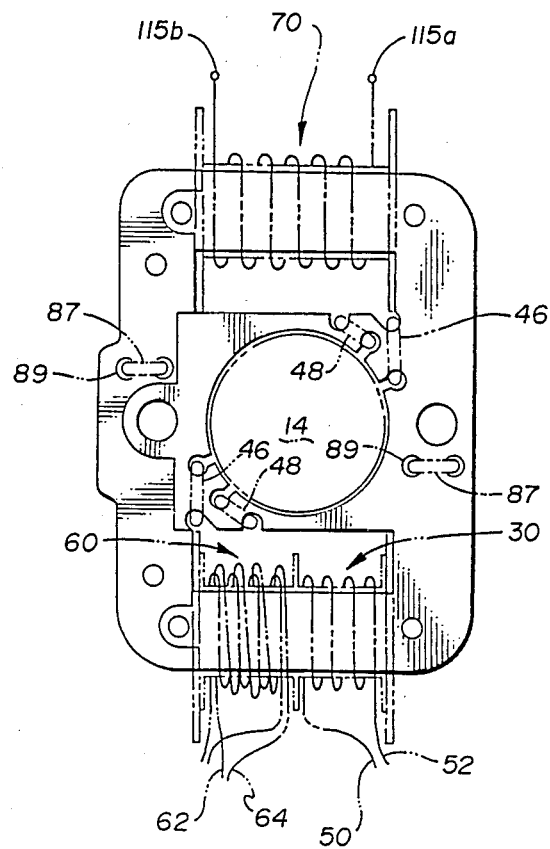
FIG. 12 is a top view of an alternative embodiment of the transmotor utilizing shorting coils to link apertures through the laminations.

A still further alternative embodiment is the provision of a modified shading coil geometry as shown in FIG. 9. Addition of further shading coils 81, which constrict the flow of flux through the motor rotor portion of the flux path, and the removal of shading coils 46 will increase the regulation of voltage on the transformer secondary 60. Alternatively, shading coils 46 can be left in their normal position and additional shorting coils 87 inserted in apertures 89 in the laminations 16 as shown in FIG. 12. Coils 87 reduce the relative flux in the transformer portion of the device without adversely affecting motor operation. Again, the increased regulation is obtained at the cost of increasing the amount of power required to drive the motor and transformer to produce a particular output.

In FIG. 10, transformer primary winding 30 is shown in a tapped configuration to provide compensation of the voltage on secondary winding 60 as motor 10 is operated. During periods when rotor 14 is not operated, relay 77 is in the condition shown in FIG. 10 and winding 30 is driven across its two end terminals 50 and 52. When switch 78 is closed, motor 10 is energized by applying power to winding 70 through contacts 73 and by switching the power to winding 30 from end terminal 52 to intermediate tap 83 by moving relay wiper 75. In one embodiment of the invention, winding 30 has 1800 turns of No. 39 wire with tap 83 at 200 turns. When the rotor is driven by energizing winding 70, the flux in path B is increased by increasing the number of ampere turns. In the embodiment, the number of ampere turns is actually increased by connecting the AC power across the 1600 turn coil by energizing tap 83, rather than the end terminal 52.

In the embodiment shown in FIG. 10, winding 30 has a high impedance when rotor 14 is not moving and the power drain and heat emission are reduced. Additionally, this configuration, because it has low flux in the transformer mode, has no torque through rotor 14 which would tend to allow the rotor to slowly rotate.

FIG. 11 shows still another embodiment of transmotor 10 where the amount of iron is reduced by providing slots or notches 88 in the laminations 16 in the vicinity of rotor 14.

It is also possible to energize winding 70 continuously while using winding 60 as the transformer secondary winding. In such an alternative embodiment, as shown in FIG. 5, all of the flux induced in leg 32 of the laminated structure does not flow in leg 38 because of the leakage through leg 40, and the transformer efficiency is therefore reduced.

In order to facilitate construction of the transmotor 10, the winding 70 is placed on a bobbin structure 80 which is then slid into place on leg 32 at the time of construction, while windings 30 and 60 which couple to flux in leg 38 are wound on a bobbin 90 which includes a central divider wall 92 to separate the windings 30 and 60 and facilitate their manufacture and the assembly of transmotor 10. After those windings are placed on bobbin 90, it can be slid over leg 38. After bobbins 80 and 90 are installed on E-shaped lamination portion 34, the cap portion 44 can be applied and the structure completed. The rear bearing supports for rotor 14 are conventional and held in place by a motor journal 96 which is bolted to lamination portion 34 utilizing bolts 98 and 100.

In the preferred embodiment shown, the E-shaped portion 34 of the laminated structure 16 has a projection 101 on central leg 40 in order to permit motor journal 96 to be mounted with both bolts 98 and 100 being affixed to the same lamination piece. By mounting motor rotor 14 on a unitary laminated structure 34, possible problems with the alignment of motor rotor 14 are eliminated. Other geometric arrangements of the laminations are, of course, possible while still providing the substantial operating advantage of mounting both sides of the rotor bearing support structure on the same piece of a two piece lamination structure. It would similarly not be suitable to utilize a lamination structure where the two pieces of the structure are joined together in the center leg 40 of the lamination structure because substantial undesired variations in the permeability of the path through that segment could occur through manufacturing variation.

FIG. 5 shows in simplified schematic form the various connections for utilizing one of the alternative embodiments of transmotor 10 in a typical microwave oven 20. The power plug 28 provides AC power to winding 70 as a primary winding for the motor and transformer 10. When only winding 70 is energized, fan 12 does not rotate because there is insufficient flux driving across the central leg 40 to drive rotor 14. The voltage from secondary winding 60 is used to drive the light for clock 22, as well as control panel 24 through conductors 62 and 64. Winding 30 can be energized from control panel 24 when the microwave oven 20 is in operation. Line voltage on conductors 115 provides a current phased to oppose the flux induced in the lower leg 38 by winding 30 and provides that flux from both windings 30 and 70 flows through the central structure 40 to provide the flux to drive shaded rotor 14 as a motor without substantially influencing the flux and hence the induced voltage.

This specification describes a preferred embodiment of my invention. The invention claimed in the claims as forth below is not to be taken as limited to all of the details described above. Modifications and variations of the structure shown as the preferred embodiment of the invention may be made without departing from the spirit or scope of the invention.

What is claimed is:

1. A transmotor for providing an output voltage proportional to an input voltage and for providing a selectively driven rotatable shaft, said transmotor comprising, in combination:
   (a) a magnetic flux conducting structure having first and second flux conducting paths therethrough;
   (b) a first winding operatively coupled to the first flux conducting path of the flux conducting structure and continuously connected to a source of input voltage for inducing flux in the first flux conducting path of the magnetic flux conducting structure;
   (c) a second winding operatively coupled to the second flux conducting path and selectively connectable to the source of input voltage to thereby induce flux therein;
   (d) a third winding operatively coupled to receive flux from either the first or the second flux conducting path to produce an output voltage; and
   (e) a motor rotor mounted on the flux conducting structure for receiving flux conducted in the first and second flux conducting paths, said rotor constructed and arranged for rotation when the second winding is connected to a source of input voltage and for remaining stationary when the second winding is not connected to a source of input voltage.

2. A transformer comprising:
   (a) a magnetic flux conducting structure having transformer and auxiliary flux conducting paths therethrough;
   (b) transformer primary winding means operatively coupled to the transformer flux conducting path of the flux conducting structure and continuously connected to a source of input voltage for inducing flux in the transformer flux conducting path of the magnetic flux conducting structure;
   (c) transformer secondary winding means operatively coupled to the transformer flux conducting path to produce a continuous output voltage;
   (d) electromechanical means mounted on the flux conducting structure for converting flux into mechanical motion when energized by flux in the transformer and the auxiliary flux conducting paths and for remaining quiescent when flux is received only from the transformer flux conducting path;
   (e) auxiliary winding means operatively coupled to the auxiliary flux conducting path and selectively connectable to a source of input voltage to induce flux therein to energize the electromechanical means.

3. A motor comprising:
   (a) stator means having first and second flux conducting paths therein;
   (b) first stator winding means operatively coupled to the first flux conducting path and selectively connectable to a power source thereby to induce flux in the first flux conducting path;
   (c) second stator winding means operatively coupled to the second flux conducting path of the stator means and continuously connected to the power source for inducing flux in the second flux conducting path;
   (d) auxiliary winding means operatively coupled to one of the first and second flux conducting paths to produce a continuous output voltage; and
   (e) rotor means operatively mounted for rotation relative to the stator means and constructed and arranged for receiving flux conducted in the first and second flux conducting paths, said rotor means constructed and arranged for rotation when the first stator winding is connected to a power source and for remaining stationary when the first stator winding is not connected to the power source.

4. In a shaded pole electric motor having a magnetic flux conducting structure and a stator winding wound on the structure to induce a flux therein in accordance with the excitation thereof, and a rotor rotatably supported in the structure, the improvement comprising:

(a) a secondary path in the magnetic flux conducting structure;

(b) a further winding operatively coupled to the flux conducting structure and selectively connectable to a voltage source for inducing flux in the secondary path in the magnetic flux conducting structure; and (c) an output winding operatively coupled to the flux conducting structure to continuously produce a voltage on the windings thereof which is proportional to the voltage of the voltage source;

wherein the motor rotor mounted on the flux conducting structure receives flux from the stator winding and the secondary path only when the further winding is connected to the voltage source.

5. In an oven including operating elements which are required to be continuously energized from a transformer having a voltage proportional to the line voltage and a movable element operated only when the oven is operated, a combination actuator and transformer comprising, in combination:

(a) a magnetic flux conducting structure having first and second flux conducting paths therethrough;

(b) a first winding operatively coupled to the first flux conducting path of the flux conducting structure and continuously connected to a source of line voltage for inducing flux in the first flux conducting path of the magnetic flux conducting structure;

(c) a second winding operatively coupled to the first flux conducting path to produce a continuous output voltage proportional to the magnitude of the line voltage;

(d) a third winding operatively coupled to the second flux conducting path and selectively connectable to the source of input voltage to induce flux therein;

(e) a movable element mounted on the flux conducting structure for receiving flux conducted in the first and second flux conducting paths, said movable element constructed and arranged for movement when the third winding is connected to a source of input voltage and for remaining stationary when the third winding is not connected to a source of input voltage; and (f) switch means connected to the third winding to energize the third winding only when the oven is in operation.

* * * * *